US012480644B2

(12) United States Patent
Bowen et al.

(10) Patent No.: US 12,480,644 B2
(45) Date of Patent: Nov. 25, 2025

(54) CONFIGURABLE FLAT MOUNTING FRAME WITH HANGER BARS

(71) Applicant: SIGNIFY HOLDING B.V., Eindhoven (NL)

(72) Inventors: John Edward Bowen, Sharpsburg, GA (US); Jared Michael Davis, Newnan, GA (US); Jyoti Kumar, Tyrone, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/638,881

(22) Filed: Apr. 18, 2024

(65) Prior Publication Data

US 2025/0198605 A1 Jun. 19, 2025

Related U.S. Application Data

(60) Provisional application No. 63/467,153, filed on May 17, 2023.

(30) Foreign Application Priority Data

Jun. 20, 2023 (EP) .................................... 23180219

(51) Int. Cl.
*F21V 21/04* (2006.01)

(52) U.S. Cl.
CPC .................................... *F21V 21/04* (2013.01)

(58) Field of Classification Search
CPC .. F21V 21/04; F21V 21/041–049; F21S 8/02; F21S 8/026
See application file for complete search history.

(56) References Cited

U.S. PATENT DOCUMENTS

| | | | | |
|---|---|---|---|---|
| 10,760,751 | B1 | 9/2020 | Bowen | |
| 11,079,075 | B2 | 8/2021 | Weyhaeghe | |
| 2008/0259614 | A1 | 10/2008 | Fryzek et al. | |
| 2020/0300428 | A1* | 9/2020 | Momin | F21V 21/04 |
| 2021/0301990 | A1 | 9/2021 | McCabe et al. | |
| 2022/0205616 | A1* | 6/2022 | Ameloot | F21V 21/22 |

* cited by examiner

*Primary Examiner* — Sean P Gramling

(57) ABSTRACT

A flat mounting frame for direct mount luminaires is disclosed that has a set of features that allows for different hanger bar attachments and length adjustments. The flat mounting frame has multiple sets of features incorporated that permit the end user to adjust its overall length, the size of the luminaire opening, and the locations of attached hanger bars.

12 Claims, 4 Drawing Sheets

Fig. 2A
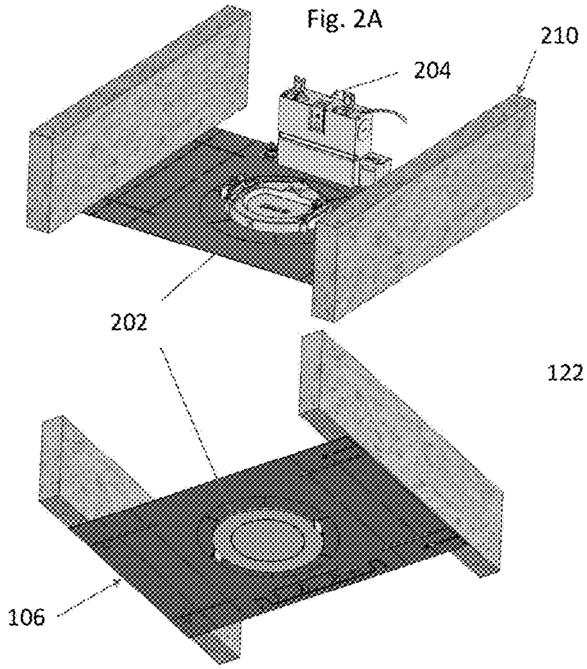
Fig. 2B
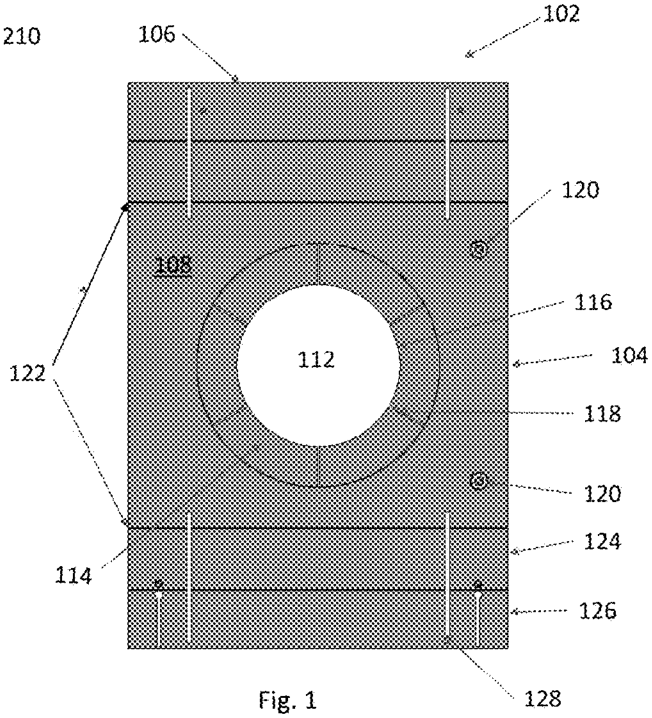
Fig. 1

CONFIGURABLE FLAT MOUNTING FRAME WITH HANGER BARS

The invention relates generally to a device for use in mounting structures for lighting fixtures, and more particularly to a device and method for direct mounting of luminaires in a ceiling or a similar mounting surface. The invention comprises features that permit different hanger bar attachments and length adjustments.

BACKGROUND

Direct mount luminaires are recessed lighting units that are installed in mounting surfaces such as drywall ceilings or suspended ceilings without a recessed housing can. Typically, the recessed lighting units are mounted in the ceiling using a mounting frame (also known as 'plaster frame') that is disposed behind the ceiling, e.g., in the plenum between the structural ceiling (roof) and a finished ceiling wall that conceals the underside of the structural ceiling. The mounting frame may be secured directly to the joists in the ceiling or supported on hanger bars that are fastened to and extend between the joists. Further, the mounting frame includes a light fixture receiving opening that is configured to receive the recessed lighting unit and secure the recessed lighting fixture to the mounting frame.

In conventional mounting frames, the shape of the light fixture receiving opening in the mounting frame may be fixed and may depend on the shape of the recessed lighting unit that is to be mounted to the mounting frame. That is, in conventional mounting frames, the shape of the light fixture receiving opening may be configured to allow a similarly shaped lighting unit to be received and mounted to the mounting frame. For example, a mounting frame with a circular light fixture receiving opening may be configured to receive and mount a lighting unit having a substantially circular shape. However, if a different lighting unit having a shape that is different from the shape of the light fixture receiving opening of the mounting frame is to be mounted, a different mounting frame with a light fixture receiving opening having a shape corresponding to or substantially similar to that of the different lighting unit will be required. In other words, to accommodate various lighting units of different shapes, several mounting frames are required, where each mounting frame has a light fixture receiving opening of a different shape. Similar problems exist for lighting units with different sizes.

The requirement for several different mounting frames imposes the need for the luminaire manufacturer to produce, and the luminaire dealers to manage increased product stock keeping units (SKUs). Additionally, in a remodel installation scenario where a user wants to replace a lighting unit having a first shape/size with a new lighting unit having a different second shape/size, the existing mounting frame having a light fixture receiving opening that is only configured to receive the lighting unit having the first shape/size will have to be removed and replaced with a different mounting frame having a light fixture receiving opening that is configured to receive the lighting unit having the second shape/size. The removal and replacement of the existing plaster frame with another plaster frame may be both labor and time intensive.

In addition to the variability in fixture shape and or size, variability in ceiling joist spacing requires flexibility in the dimensions of the mount frame, as well as the lengths and positioning of hanger bars used to secure the mounting frame. The present invention seeks to overcome these problems in the prior art by allowing the installer to adjust the shape/size of the mount frame opening for direct mount luminaires, to adjust the size of the mounting frame for specific applications, and to attach different hanger bars to support different ceiling sizes and types.

SUMMARY OF THE PRESENT INVENTION

According to an exemplary embodiment, a flat mounting frame is provided that has a set of features that allows for hanger bar attachment and length adjustment. In additional embodiments, the flat mounting frame has multiple sets of features incorporated that readily allow the end user to adjust its overall length and to attach multiple sets of hanger bars. In still further embodiments, the flat mounting frame has features to accommodate multiple size fixtures.

The noted embodiments of the invention solves multiple problems for customers. That is, the customer can purchase the invention's one flat mounting frame and configure the frame for a variety of ceiling applications or different fixture sizes.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the figures, elements which correspond to elements already described may have the same reference numerals. In the drawings, FIG. 1 illustrates a top view of an exemplary configurable mounting frame, in accordance with example embodiments of the present disclosure;

FIGS. 2A and 2B illustrate prospective views of the mounting frame having been installed directly into two ceiling joists;

DETAILED DESCRIPTION OF PREFERRED EMBODIMENTS

Figure 3A:
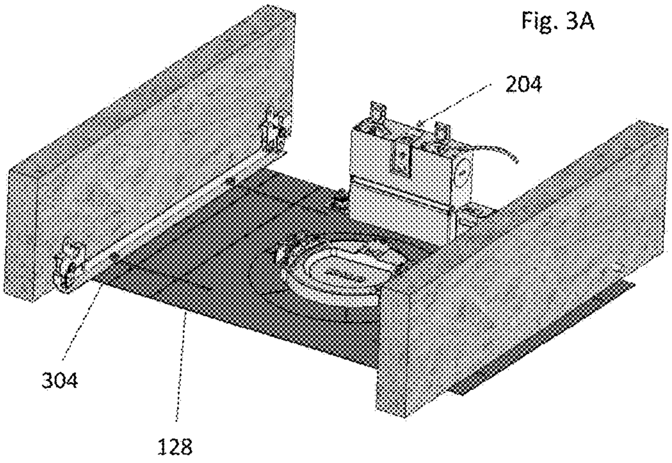
FIGS. 3A and 3B illustrate prospective views of the mounting frame having been installed between two ceiling joists using hanging bars positioned parallel to the ceiling joists.

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

In the following paragraphs, the present disclosure will be described in further detail by way of examples with reference to the attached drawings. In the description, well known components, methods, and/or processing techniques are omitted or briefly described so as not to obscure the disclosure. As used herein, the "present disclosure" and/or "present invention" refers to any one of the embodiments of the disclosure described herein and any equivalents. Furthermore, reference to various feature(s) of the "present disclosure" is not to suggest that all embodiments must include the referenced feature(s).

FIG. 1 illustrates a top view of an exemplary configurable flat mounting frame 102, in accordance with example embodiments of the present disclosure. In this embodiment, the mounting frame is rectangular in shape, having longitudinal edges 104 spanning its length and corresponding lateral edges 106 spanning its width. As illustrated in FIGS. 2A and 2B, the lateral edges 106 are typically installed parallel to the supporting ceiling joists 210. The invention is not so limited as other mounting frame shapes and orientations of the mounting frames are contemplated by the invention.

The frame 102 has a first surface 108 and a second surface 110 that is disposed opposite to the first surface 108. The frame 102 includes a light fixture receiving opening 112 (herein 'fixture receiving opening') that is formed therein. The fixture receiving opening 112 may be configured to receive a direct mount luminaire 202 (herein 'luminaire') to mount the luminaire to the frame 102 (as shown in FIGS. 2A and 2B). The fixture receiving opening 112 may be a through opening that extends from the first surface 108 of the frame 102 through the second surface 110. It should be understood that the luminaire can extend through the fixture receiving opening 112 or the luminaire may be attached to the frame such that the luminaire is disposed at or slightly above the fixture receiving opening 112 (as illustrated in FIGS. 2A and 2B.

Further, the mounting frame 102 may include breakaway panels 114 formed therein. The breakaway panels 114 may be disposed adjacent to and along at least a portion of an aperture edge 116 that defines a perimeter of the fixture receiving opening 112. In the example embodiment illustrated in FIG. 1, the breakaway panels 114 may be marked (or outlined) by slits 118 formed in the mounting frame 102. In other example embodiments, the breakaway panels 114 may be marked using any other appropriate mechanism. For example, in some embodiments, the breakaway panels 114 may be marked by perforated lines or score lines. In either case, each breakaway panel 114 may be detachable from the mounting frame 102 along the slits 118 that mark the respective breakaway panel 114.

The breakaway panels 114 are configured to be detached from the mounting frame 102 to change the shape or size of the fixture receiving opening 112. That is, the breakaway panels 114 allow the same mounting frame 102 to be used for mounting luminaires having different shapes by detaching the breakaway panels 114 from the mounting frame 102 to change the shape of the fixture receiving opening 112 from a first shape to a second shape. The second shape may be different from the first shape and may include, but is not limited to, a circle, a square, a rectangle, an oval, or any other appropriate shape. The use of breakaway panels to conform the mounting frame light fixture receiving opening 112 to varying sized/shape light fixtures is described in greater detail in U.S. Pat. No. 10,760,751 in the name of John Bowen and entitled "Configurable Mounting Frame for Direct Mount Luminaires," the entire contents of which is hereby incorporated herein by reference.

Further, in the embodiments depicted in FIGS. 1 and 2A, the mounting frame includes attachment features 120 that are configured to secure and removably couple an electrical and/or electronic component such as a junction box assembly or a LED driver assembly 204. Examples of such attachment features 120 include threaded or unthreaded holes for use in combination with bolts and/or screws.

FIG. 1 depicts an additional embodiment of the invention in which slots 122 in the mounting frame are employed to enable breakaway sections (e.g., 124, 126) of the mounting frame to be removed and thereby adjust its length. This feature permits the customer to purchase this one flat mounting frame and configure the frame for a variety of ceiling applications.

Figure 3B:
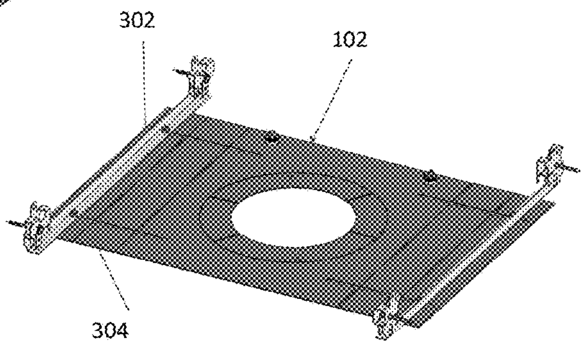

This flexibility in the employment of the invention's mounting frame is further enhanced by the features illustrated in the embodiment of the invention depicted in FIGS. 3A and 3B. These figures depict prospective views of the mounting frame 102 having been installed between two ceiling joists 210 using hanging bars 302 positioned on the mounting frame 102 parallel to and secured to the ceiling joists. As illustrated, each hanger bar 302 comprises a plurality of attachment devices 304 that mate with a channel 128 on the mounting frame 102. With the hanger bar 302 once secured to the ceiling joist 210, the luminaire's position (in a longitudinal direction) between the ceiling joists is affected by the position of the attachment device 304 along the channel 128. In the situations in which the attachment device is a bolt or screw, no additional securing is normally required to fix the position of the hanger bar's position in the channel 304. In situations in which the attachment device 304 is a boss or a tongue, or if additional security in the connection is desired, glue or some other type of sealing agent can be employed.

Figure 4A:
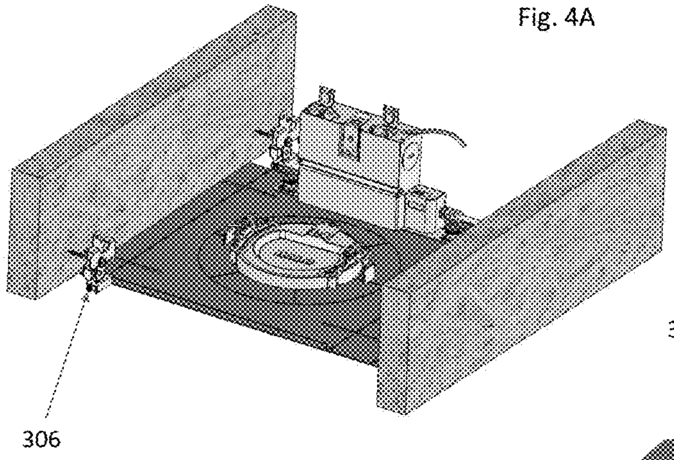
FIGS. 4A and 4B illustrate prospective views of the mounting frame having been installed between two ceiling joists using hanging bars positioned perpendicular to the ceiling joists; and, FIGS. 5A and 5B illustrate prospective views of a further embodiment of the invention wherein hanger bar fasteners are positioned within grooves running lengthwise, proximate each longitudinal side edge of the mounting frame.
Figure 4B:
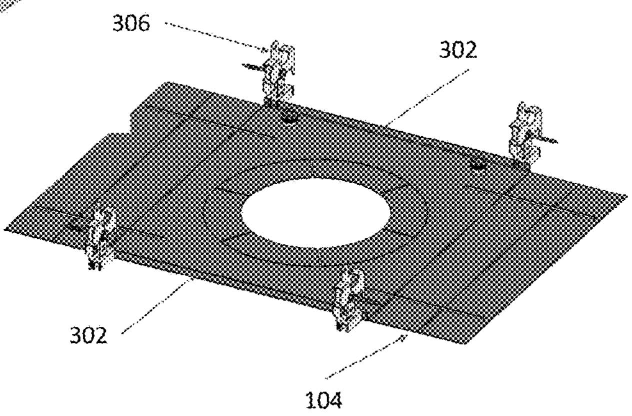

FIGS. 4A and 4B depict additional embodiments of the invention. FIGS. 4A and 4B illustrate prospective views of the mounting frame 102 having been installed between two ceiling joists using hanging bars positioned perpendicular to the ceiling joists. In this embodiment hanger bars 302 are attached (to the longitudinal edges 104 of the mounting frame 102 and are secured to the ceiling joists via attachment members 306. In one embodiment, the hanger bars are of a fixed standard length (e.g., to be used on ceiling joists which are positioned on 16" centers). In an alternative embodiment the hanger bars are expandable in a direction along the longitudinal edge 104 of the mounting frame 102.

Figure 5A:
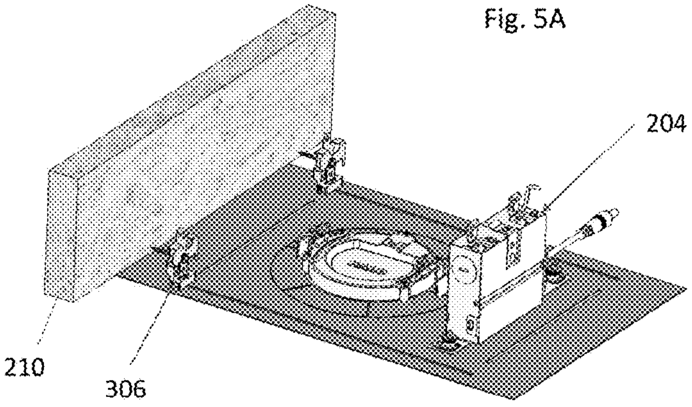
Figure 5B:
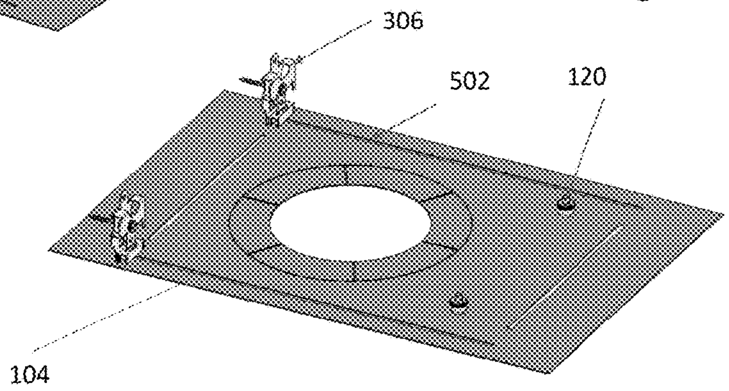

FIGS. 5A and 5B depict an additional embodiment of the invention in which two attachment members 306 alone, without any hanger bars, are employed to secure the mounting frame to a ceiling joist. In this embodiment, two slots 502, extend parallel to the longitudinal edge of the mounting frame. Each attachment member 306 slides along a slot to a desired position relative to the ceiling joist 210. Once so positioned, each attachment member is secured in place via a screw (not illustrated) or other well-known methods and the attachment member is secured to the ceiling joist.

The foregoing detailed description has set forth a few of the many forms that the invention can take. The above examples are merely illustrative of several possible embodiments of various aspects of the present invention, wherein equivalent alterations and/or modifications will occur to others skilled in the art upon reading and understanding of the present invention and the annexed drawings. In particular, regard to the various functions performed by the above described components, the terms used to describe such components are intended to correspond, unless otherwise indicated to any component, such as hardware or combinations thereof, which performs the specified function of the described component (i.e., that is functionally equivalent), even though not structurally equivalent to the disclosed structure which performs the function in the illustrated implementations of the disclosure.

Although a particular feature of the present invention may have been illustrated and/or described with respect to only one of several implementations, such feature may be combined with one or more other features of the other implementations as may be desired and advantageous for any given or particular application. Furthermore, references to singular components or items are intended, unless otherwise specified, to encompass two or more such components or items. Also, to the extent that the terms "including", "includes", "having", "has", "with", or variants thereof are used in the detailed description and/or in the claims, such terms are intended to be inclusive in a manner similar to the term "comprising".

The present invention has been described with reference to the preferred embodiments. However, modifications and alterations will occur to others upon reading and understanding the preceding detailed description. It is intended that the present invention be construed as including all such modifications and alterations. It is only the claims, including all equivalents that are intended to define the scope of the present invention.

In the claims references in parentheses refer to reference signs in drawings of exemplifying embodiments or to formulas of embodiments, thus increasing the intelligibility of the claim. These references shall not be construed as limiting the claim.

The invention claimed is:

1. A configurable flat mounting frame, the mounting frame having a length and a width and comprising:
- a longitudinal edge and a lateral edge,
- a light fixture receiving opening formed therein, the light fixture receiving opening having a first shape and configured to receive a light fixture,
- a breakaway panel disposed adjacent to the light fixture receiving opening, the breakaway panel being detachable from the mounting frame to change the light fixture receiving opening from the first shape to a plurality of second shapes to thereby accommodate different shapes and sizes of light fixtures,
- wherein the breakaway panel is outlined by at least one slit along which the breakaway panel is detachable from the mounting frame, and
- wherein slots substantially parallel to the lateral edge outline breakaway sections of the mounting frame, said breakaway sections enabling adjustment of the mounting frame length.

2. The configurable mounting frame of claim 1 further comprising at least one attachment feature configured to attach an electrical component to the mounting frame.

3. The configurable mounting frame of claim 1 further comprising channels for direct mounting of the mounting frame to an underside of a ceiling joist using an attachment device, said attachment device selected from the group consisting of nails, screws, and pins.

4. The configurable mounting frame of claim 1 further comprising:
- at least one channel proximate each lateral edge of the mounting frame, the channel extending in a direction substantially perpendicular to the lateral edge,
- the channel enabling a plurality of attachment devices on the hanger bar to mate and thereby secure the hanger bar to the mounting frame,
- wherein the channels enable the luminaire to be positioned at a flexible distance perpendicular to a ceiling joist.

5. The configurable mounting frame of claim 4 wherein the attachment devices are selected from the group consisting of a bolt, a screw, a bolt, and a tongue.

6. The configurable mounting frame of claim 1 wherein hanger bars are attached to the longitudinal edges of the mounting frame, the mounting bars comprising attachment members at each end of the mounting bar to enable securing the hanging bars between and substantially perpendicular to two ceiling joists.

7. The configurable mounting frame of claim 6 wherein hanger bars have an adjustable length along the longitudinal edge of the mounting frame.

8. The configurable mounting frame of claim 1 for mounting to a single ceiling joist, the mounting frame comprising:
- a slot proximate each longitudinal edge of the mounting frame, the slot extending in a direction substantially perpendicular to the lateral edge,
- the slot enabling a single attachment device to mate and thereby secure the attachment device to the mounting frame,
- wherein the attachment device secures the mounting frame to the single ceiling joist,
- wherein the slot enables the luminaire to be positioned at a flexible distance perpendicular to the ceiling joist.

9. A method of securing a luminaire between two ceiling joist using the flat mounting frame of claim 1, the method comprising the steps of:
- removing any breakaway panels as necessary to ensure that the light fixture opening can accommodate the size and shape of the luminaire, and
- mounting the luminaire to the flat mounting frame.

10. A method of securing a luminaire between two ceiling joists using the flat mounting frame of claim 5, the method comprising the steps of:
- attaching a hanger bar to each of the ceiling joists,
- positioning the attachment devices of each hanger bar in a respective channel of the flat mounting frame, and
- securing the flat mounting frame using the attachment devices once the desired position of the luminaire between the two ceiling joists is attained.

11. A method of securing a luminaire between two ceiling joists using the flat mounting frame of claim 6, the method comprising the steps of:
- attaching a hanger bar to each longitudinal edge of the mounting frame, and
- adjusting the length of each hanger bar in order to properly secure each to the ceiling joists.

12. A method of securing a luminaire to a single ceiling joist using the flat mounting frame of claim 8, the method comprising the steps of:
- positioning in each slot an attachment device,
- securing each attachment device to the ceiling joist,
- adjusting the luminaire to a desired distance from the ceiling joist, and
- fixing the position of each attachment device in its respective slot.

* * * * *